United States Patent
Li et al.

(10) Patent No.: US 11,683,518 B2
(45) Date of Patent: *Jun. 20, 2023

(54) CONSTRAINING SUB-BLOCK MOTION VECTORS AND DETERMINING ADJUSTMENT VALUES BASED ON THE CONSTRAINED SUB-BLOCK MOTION VECTORS

(71) Applicant: Tencent America LLC, Palo Alto, CA (US)

(72) Inventors: Guichun Li, San Jose, CA (US); Xiang Li, Saratoga, CA (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,144

(22) Filed: Apr. 27, 2022

(65) Prior Publication Data

US 2022/0256185 A1    Aug. 11, 2022

Related U.S. Application Data

(63) Continuation of application No. 16/822,965, filed on Mar. 18, 2020, now Pat. No. 11,343,525.

(Continued)

(51) Int. Cl.
*H04N 19/513*    (2014.01)
*H04N 19/176*    (2014.01)
(Continued)

(52) U.S. Cl.
CPC ......... *H04N 19/513* (2014.11); *H04N 19/176* (2014.11); *H04N 19/105* (2014.11);
(Continued)

(58) Field of Classification Search
None
See application file for complete search history.

(56) References Cited

U.S. PATENT DOCUMENTS 6,091,460 A    7/2000  Hatano et al.
8,665,958 B2   3/2014  Kim et al.
(Continued)

FOREIGN PATENT DOCUMENTS

WO    2018012933 A1    1/2018
WO    2018230493 A1   12/2018

OTHER PUBLICATIONS

International Search Report and Written Opinion dated Jun. 22, 2020 in PCT/US20/23500.

(Continued)

*Primary Examiner* — Stefan Gadomski
(74) *Attorney, Agent, or Firm* — Arentfox Schiff LLP

(57) ABSTRACT

An apparatus is provided and includes processing circuitry that determines a plurality of first sub-block motion vectors for a plurality of sub-blocks of a current block. The processing circuitry determines a plurality of second sub-block motion vectors by respectively constraining the plurality of first sub-block motion vectors according to a first target range. The processing circuitry determines a set of gradient values associated with a current sample location in a current sub-block from the plurality of sub-blocks according to a reference sub-block. The processing circuitry determines a set of adjustment values associated with the current sample location according to the set of gradient values and an adjustment vector associated with the current sample location. Further, the processing circuitry generates a predicted sample associated with the current sample location according to a combination of a corresponding sample in the reference sub-block and the set of adjustment values.

20 Claims, 13 Drawing Sheets

Related U.S. Application Data

(60) Provisional application No. 62/820,563, filed on Mar. 19, 2019.

(51) Int. Cl.
  H04N 19/58 (2014.01)
  H04N 19/105 (2014.01)
  H04N 19/57 (2014.01)
  H04N 19/56 (2014.01)
  H04N 19/44 (2014.01)
  H04N 19/573 (2014.01)
  H04N 19/577 (2014.01)

(52) U.S. Cl.
  CPC .............. *H04N 19/44* (2014.11); *H04N 19/56* (2014.11); *H04N 19/57* (2014.11); *H04N 19/573* (2014.11); *H04N 19/577* (2014.11); *H04N 19/58* (2014.11)

(56) References Cited

U.S. PATENT DOCUMENTS

| | | | |
|---|---|---|---|
| 2005/0089098 A1 | 4/2005 | Sato et al. | |
| 2008/0192982 A1 | 8/2008 | Living | |
| 2009/0115851 A1 | 5/2009 | Rieder et al. | |
| 2010/0166075 A1 | 7/2010 | Lee et al. | |
| 2015/0131732 A1 | 5/2015 | Kim et al. | |
| 2015/0222919 A1 | 8/2015 | Licata | |
| 2016/0142727 A1 | 5/2016 | Bernal et al. | |
| 2017/0332095 A1 | 11/2017 | Zou et al. | |
| 2017/0347116 A1* | 11/2017 | Lin .................... | H04N 19/157 |
| 2018/0070102 A1 | 3/2018 | Zhang et al. | |
| 2018/0098063 A1 | 4/2018 | Chen et al. | |
| 2018/0098087 A1 | 4/2018 | Li et al. | |
| 2018/0184108 A1 | 6/2018 | Zhang et al. | |
| 2018/0316929 A1 | 11/2018 | Li et al. | |
| 2019/0028731 A1 | 1/2019 | Chuang et al. | |
| 2019/0037231 A1 | 1/2019 | Ikai et al. | |
| 2019/0045215 A1 | 2/2019 | Chen et al. | |
| 2019/0082191 A1 | 3/2019 | Chuang et al. | |
| 2019/0098329 A1 | 3/2019 | Han et al. | |
| 2019/0116376 A1 | 4/2019 | Chen et al. | |
| 2019/0158870 A1 | 5/2019 | Ku et al. | |
| 2019/0182503 A1 | 6/2019 | Tsai et al. | |
| 2019/0230361 A1 | 7/2019 | Zhang et al. | |
| 2020/0077115 A1 | 3/2020 | Li et al. | |
| 2020/0128258 A1 | 4/2020 | Chen et al. | |
| 2020/0221117 A1 | 7/2020 | Liu et al. | |
| 2020/0296404 A1 | 9/2020 | Yasugi et al. | |
| 2020/0322599 A1 | 10/2020 | Chuang et al. | |
| 2020/0366931 A1 | 11/2020 | Ko et al. | |
| 2020/0374545 A1 | 11/2020 | Lai et al. | |
| 2021/0067783 A1 | 3/2021 | Liu et al. | |
| 2021/0176485 A1 | 6/2021 | Chuang et al. | |
| 2021/0266585 A1 | 8/2021 | Liu et al. | |
| 2021/0392367 A1 | 12/2021 | Zhang et al. | |

OTHER PUBLICATIONS

Jiancong (Daniel) Luo et al. "CE2-related: Prediction refinement with optical flow for affine mode," Joint Video Experts Team (JVET) of Itu-T SG 16 WP 3 and ISO/IEC JTC 1/SC 29/WG 11 14th Meeting: Geneva, CH, Mar. 19-27, 2019; Document: JVET-N0236.

Hanhart, P. et al. "Non-CE2: Motion vector clipping in affine sub-block motion vector derivation", Joint Video Experts Team of ITU-T SG 16 WP 3 and ISO/IEC JTC1/SC29/WG11 13th Meeting: Marrakech, MA, Jan. 9-18, 2019, Document JVET-M0145-v1.

He, Yuwen et al. "CE4-related: Affine motion estimation improvements", Joint Video Experts Team of ITU-T SG 16 WP 3 and ISO/IEC JTC1/SC29/WG11, 12th Meeting Macao, CN Oct. 3-12, 2018, Document JVET-L0260-r2.

Pham Van, L et al. "CE4-related: Affine restrictions for the worst-case bandwidth reduction", Joint Video Experts Team of ITU-T SG 16 WP 3 and ISO/IEC JTC1/SC29/WG11, 12th Meeting, Macao, CN Oct. 3-12, 2018, Document JVET-L0396-V5.

Extended European Search Report dated Dec. 23, 2021 in Application No. 20773485.6.

Jiancong (Daniel) Luo et al. "CE2-related: Prediction refinement with optical flow for affine mod," Joint Video Experts Team (JVET) of ITU-T SG 16 WP 3 and ISO/IEC JTC 1/SC 29/WG 11 14th Meeting: Geneva, CH, Mar. 19-27, 2019 Document: JVET-N0236-r1.

Benjamin Brass, et al. "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019 Document: JVET-M1001-v7.

ITU-T Telecommunication Union, Telecommunication Standardization Sector of ITU, "High Efficiency Video Coding H.265", Series H: Audiovisual and Multimedia Systems Infrastructure of audiovisual services—Coding of moving video, Dec. 2016 (664 pages).

Sri Nitchith Akula, et al., "Description of SDR, HDR and 360° video coding technology proposal considering mobile application scenario by Samsung, Huawei, GoPro, and HiSilicon", Document: JVET-J0024_v2, [online], Joint Video Exploration Team (JVET) of ITU-T SG 16 WP 3 and ISO/IEC JTC 1/SC 29/WG 11, JVET-J0024 (version 5), Apr. 14, 2018, pp. 54-57.

Min Gao, et al., "CE-2.4.5: Sub-block MV clip in affine prediction", Document: JVET-M0488-v2, [online], Joint Video Experts Team (JVET) ofITU-T SG 16 WP 3 and ISO/IEC JTC 1/SC 29/WG 11, JVET-M0488 (version 2), Apr. 4, 2019, pp. 1-3.

Min Gao, et al., "CE4-related: Sub-block MV clipping in affine prediction", Document: JVET-L0317-r1, [online], Joint Video Experts Team (JVET) of ITU-T SG 16 WP 3 and ISO/IEC JTC 1/SC 29/WG 11, JVET-L0317 (version 2), Sep. 30, 2018, pp. 1-3.

Japanese Office Action dated Feb. 6, 2023 in Application No. 2021-536187 with English Translation, pp. 1-34.

* cited by examiner

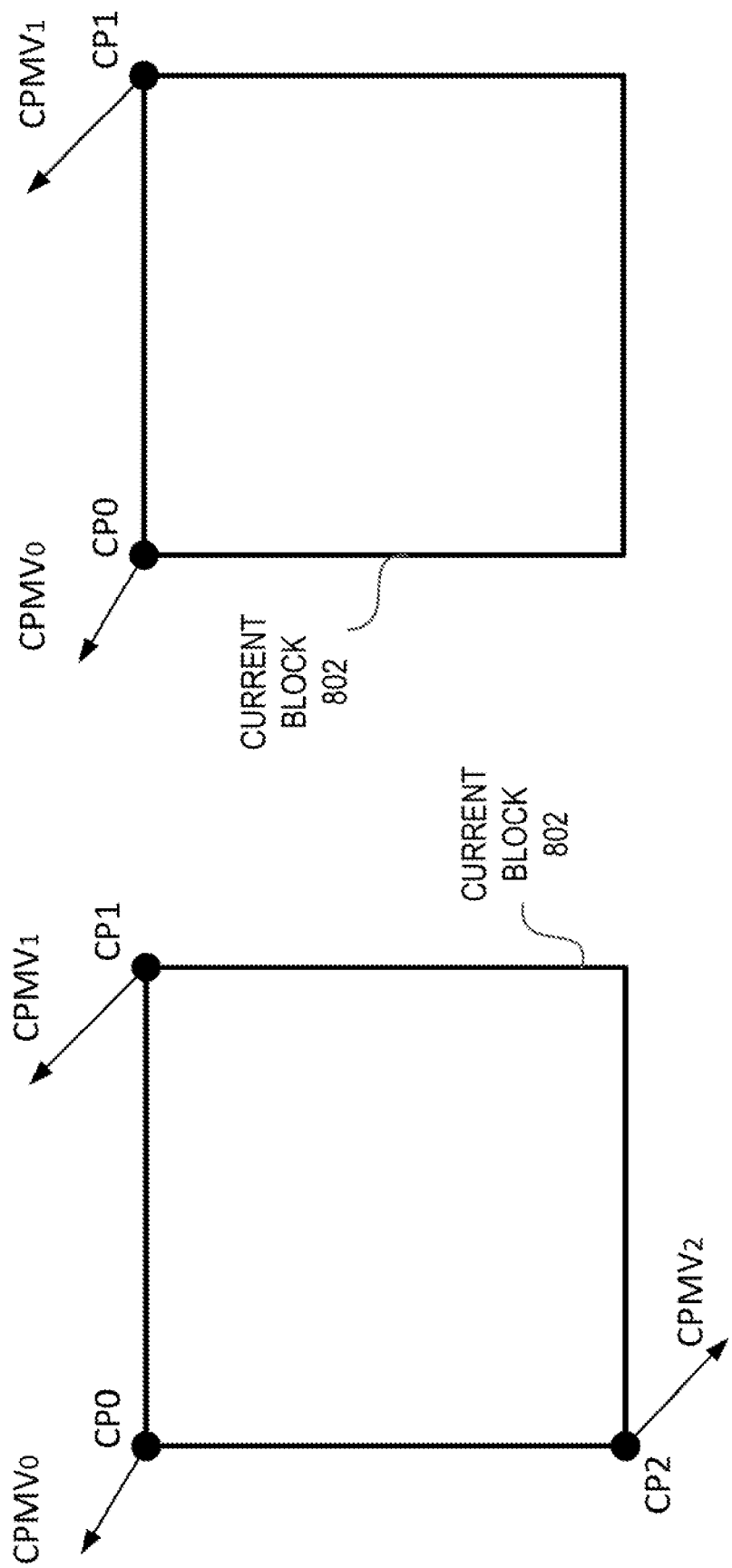

US 11,683,518 B2

CONSTRAINING SUB-BLOCK MOTION VECTORS AND DETERMINING ADJUSTMENT VALUES BASED ON THE CONSTRAINED SUB-BLOCK MOTION VECTORS

INCORPORATION BY REFERENCE

This present application claims the benefit of priority to U.S. patent application Ser. No. 16/822,965, "METHOD AND APPARATUS FOR VIDEO CODING BY CONSTRAINING SUB-BLOCK MOTION VECTORS AND DETERMINING ADJUSTMENT VALUES BASED ON CONSTRAINED SUB-BLOCK MOTION VECTORS" filed on Mar. 18, 2020, which claims the benefit of priority to U.S. Provisional Application No. 62/820,563, "AFFINE INTER PREDICTION REFINEMENT WITH MV CLIPPING" filed on Mar. 19, 2019. The disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described herein is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five neighboring blocks, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus includes processing circuitry that determines a plurality of first sub-block motion vectors for a plurality of sub-blocks of a current block according to a plurality of control point motion vectors of the current block, determines a first target range along a first coordinate direction for the current block, and determines a plurality of second sub-block motion vectors according to the plurality of first sub-block motion vectors and the first target range, the first target range limiting first coordinate direction components of the plurality of second sub-block motion vectors. The processing circuitry also determines a set of gradient values associated with a current sample location in a current sub-block from the plurality of sub-blocks according to a reference sub-block identified by a current second sub-block motion vector that corresponds to the current sub-block from the plurality of second sub-block motion vectors, determines an adjustment vector associated with the current sample location according to the plurality of control point motion vectors of the current block, and determines a set of adjustment values associated with the current sample location according to the set of gradient values and the adjustment vector. The processing circuitry generates a predicted sample associated with the current sample location according to a combination of a corresponding sample in the reference sub-block and the set of adjustment values.

In some embodiments, the first target range limits a maximum difference of integer-pixel portions of the first coordinate direction components of the plurality of second sub-block motion vectors to be no greater than a first target difference. In some embodiments, the first target difference ranges from 0 to 3 integer pixels.

In some embodiments, the processing circuitry further determines the first target difference according to one or more of a size and a shape of the current block. In some embodiments, the processing circuitry further determines the first target difference according to a predetermined value set by a video coding standard or signaled via a coded video bitstream.

In some embodiments, the processing circuitry can determine the first target range along the first coordinate direction for the current block by determining one of an upper bound value and a lower bound value of the first target range along the first coordinate direction according to a maximum value or a minimum value of first coordinate direction components of the plurality of first sub-block motion vectors, and by determining the other one of the upper bound value and the lower bound value of the first target range along the first coordinate direction according to the determined one of the upper bound value and the lower bound value and a first target difference.

In some examples, the determining the plurality of second sub-block motion vectors according to the plurality of first sub-block motion vectors and the first target range can includes determining whether the first coordinate direction component of one of the plurality of first sub-block motion vectors is greater than the upper bound value or less than the lower bound value, the one of the plurality of first sub-block motion vectors being for one of the plurality of sub-blocks, setting the first coordinate direction component of one of the plurality of second sub-block motion vectors to the upper bound value when the first coordinate direction component of the one of the plurality of first sub-block motion vectors is determined to be greater than the upper bound value, the one of the plurality of second sub-block motion vectors being for the one of the plurality of sub-blocks, and setting the first coordinate direction component of the one of the plurality of second sub-block motion to the lower bound value when the first coordinate direction component of the one of the plurality of first sub-block motion vectors is determined to be less than the lower bound value.

In some embodiments, the determining the plurality of second sub-block motion vectors according to the plurality of first sub-block motion vectors and the first target range further includes setting the first coordinate direction component of the one of the plurality of second sub-block motion to be the same as the first coordinate direction component of the one of the plurality of first sub-block motion vectors when the first coordinate direction component of the one of the plurality of first sub-block motion vectors is determined not to be greater than the upper bound value and not less than the lower bound value.

In some embodiments, the processing circuitry further determines a second target range along a second coordinate direction for the current block, the second target second limiting second coordinate direction components of the plurality of second sub-block motion vectors. The determining the plurality of second sub-block motion vectors is performed according to the plurality of first sub-block motion vectors, the first target range, and the second target range.

In some embodiments, the first target range limits a first maximum difference of integer-pixel portions of the first coordinate direction component of the plurality of second sub-block motion vectors to be no greater than a first target difference. In some embodiments, the second target range limits a second maximum difference of integer-pixel portions of the second coordinate direction component of the plurality of second sub-block motion vectors to be no greater than a second target difference. In some examples, each of the plurality of sub-blocks has a size of 4×4 pixels, the first target difference is 1 pixel, and the second target difference is 1 pixel.

In some embodiments, the processing circuitry further determines a set of adjustment vectors associated with sample locations in the current sub-block according to the plurality of control point motion vectors of the current block, the sample locations being relative positions with respect to the current sub-block. The set of adjustment vectors can be applicable to all other sub-blocks of the current block.

In some embodiments, the determining the set of gradient values is performed according to the reference sub-block and a 3-tap filter.

Aspects of the disclosure also provide a non-transitory computer-readable medium storing instructions which when executed by a computer for video decoding cause the computer to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 8A is a schematic illustration of a 6-parameter (according to three control points) affine model in accordance with an embodiment.

FIG. 8B is a schematic illustration of a 4-parameter (according to two control points) affine model in accordance with an embodiment.

DETAILED DESCRIPTION OF EMBODIMENTS

I. Video Coding Encoder and Decoder

Figure 1:
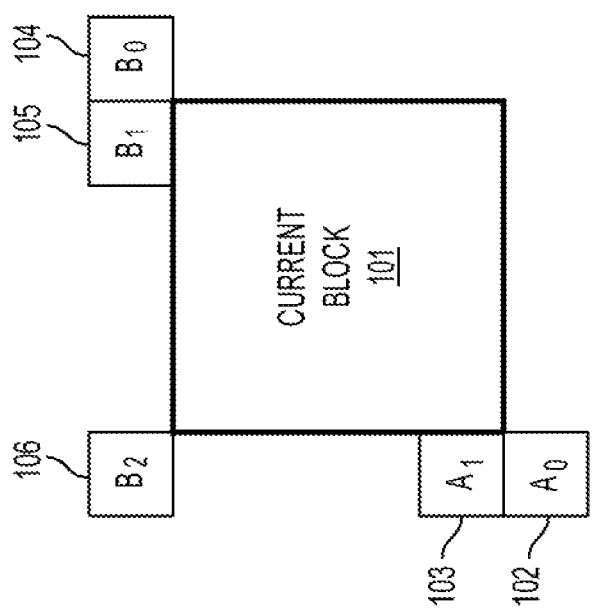
FIG. 1 is a schematic illustration of a current block and its surrounding spatial merge candidates in one example.
Figure 2:
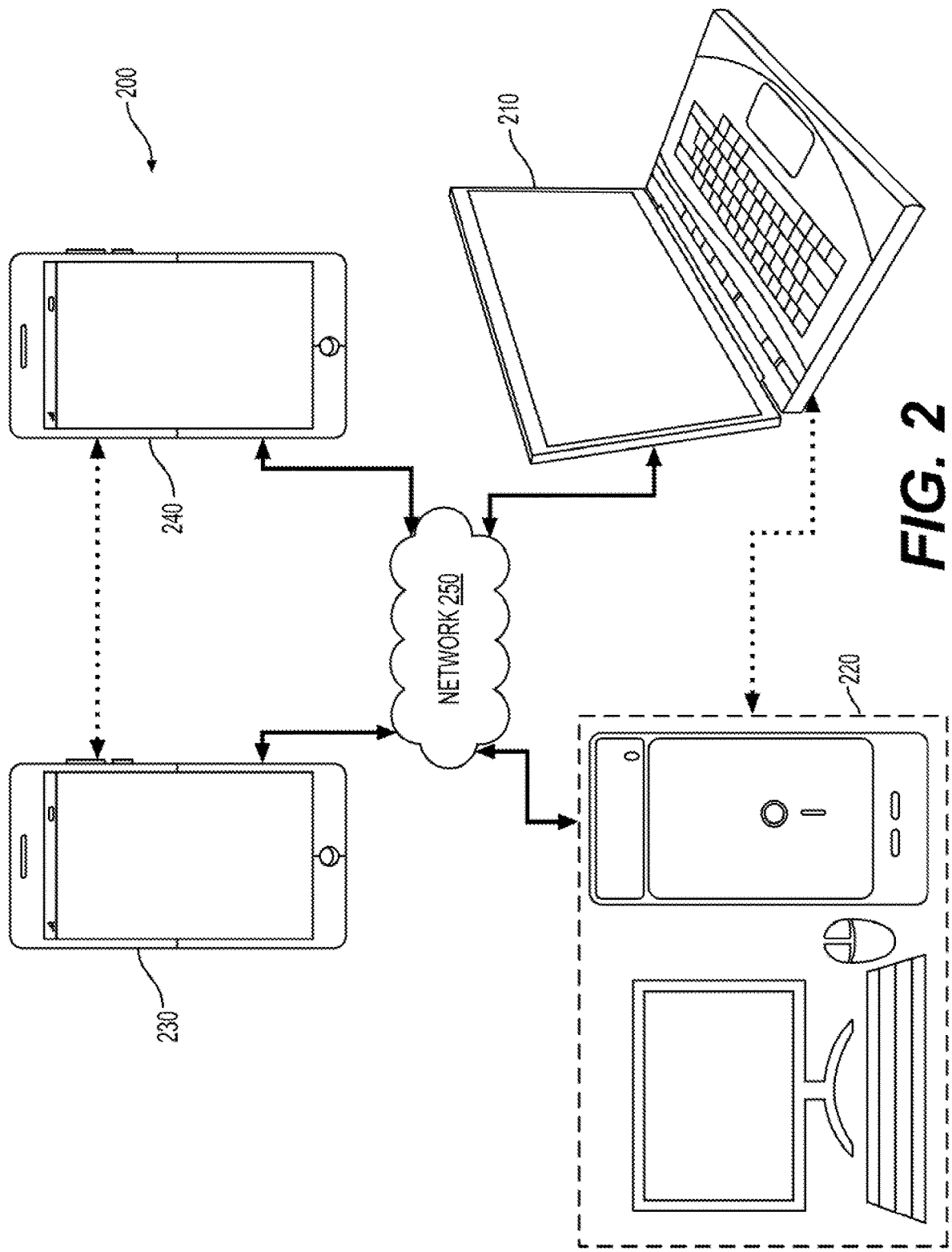
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures, and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230), and (240) may be illustrated as servers, personal computers, and smart phones, but the principles of the present disclosure may be not so limited. Embodiments of the present disclosure find application with laptop computers, tablet computers, media players, and/or dedicated video conferencing equipment. The network (250) represents any number of networks that convey coded video data among the terminal devices (210), (220), (230), and (240), including for example wireline (wired) and/or wireless communication networks. The communication network (250) may exchange data in circuit-switched and/or packet-switched channels. Representative networks include telecommunications networks, local area networks, wide area networks, and/or the Internet. For the purposes of the present discussion, the architecture and topology of the network (250) may be immaterial to the operation of the present disclosure unless explained herein below.

Figure 3:
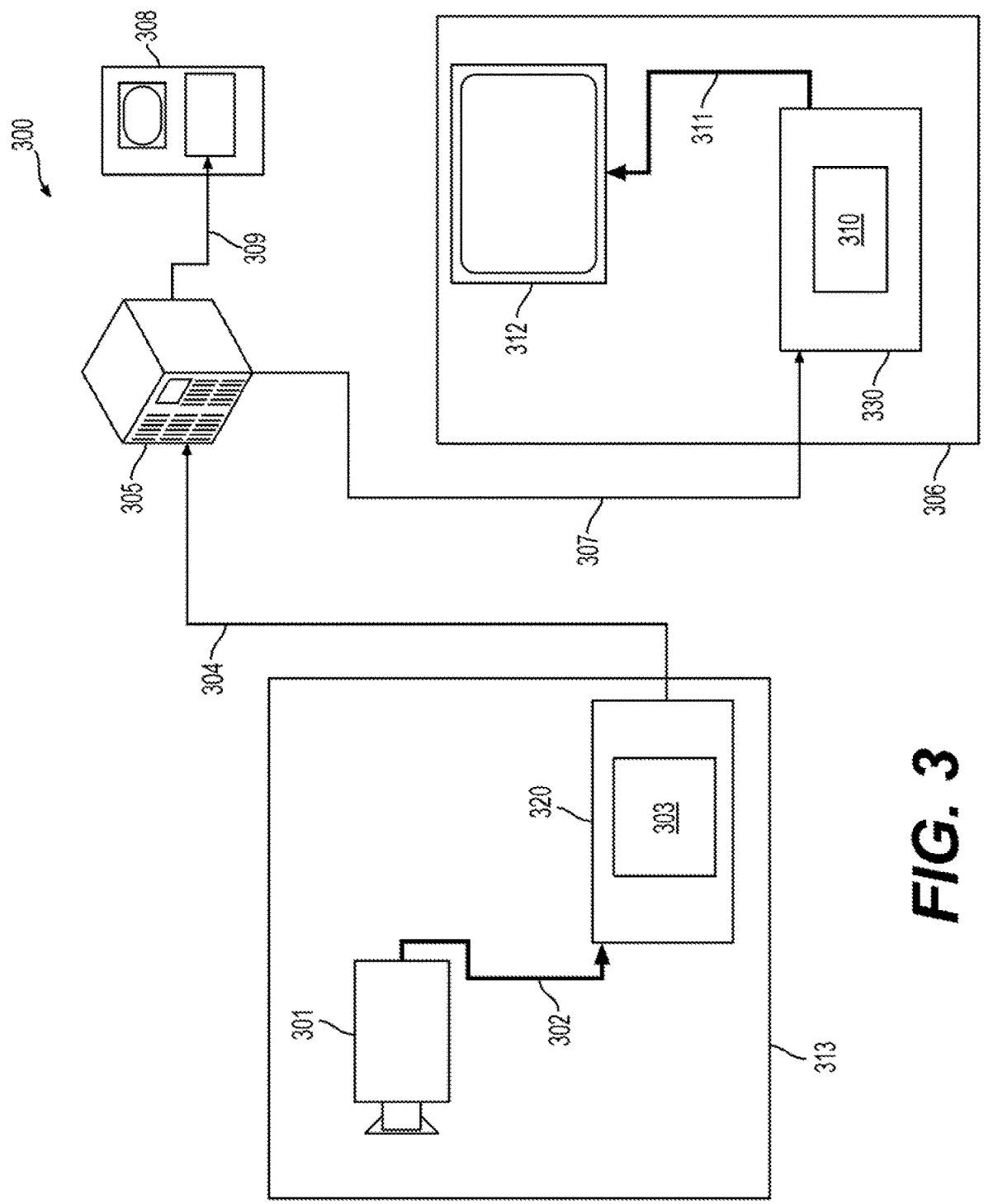
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3, can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
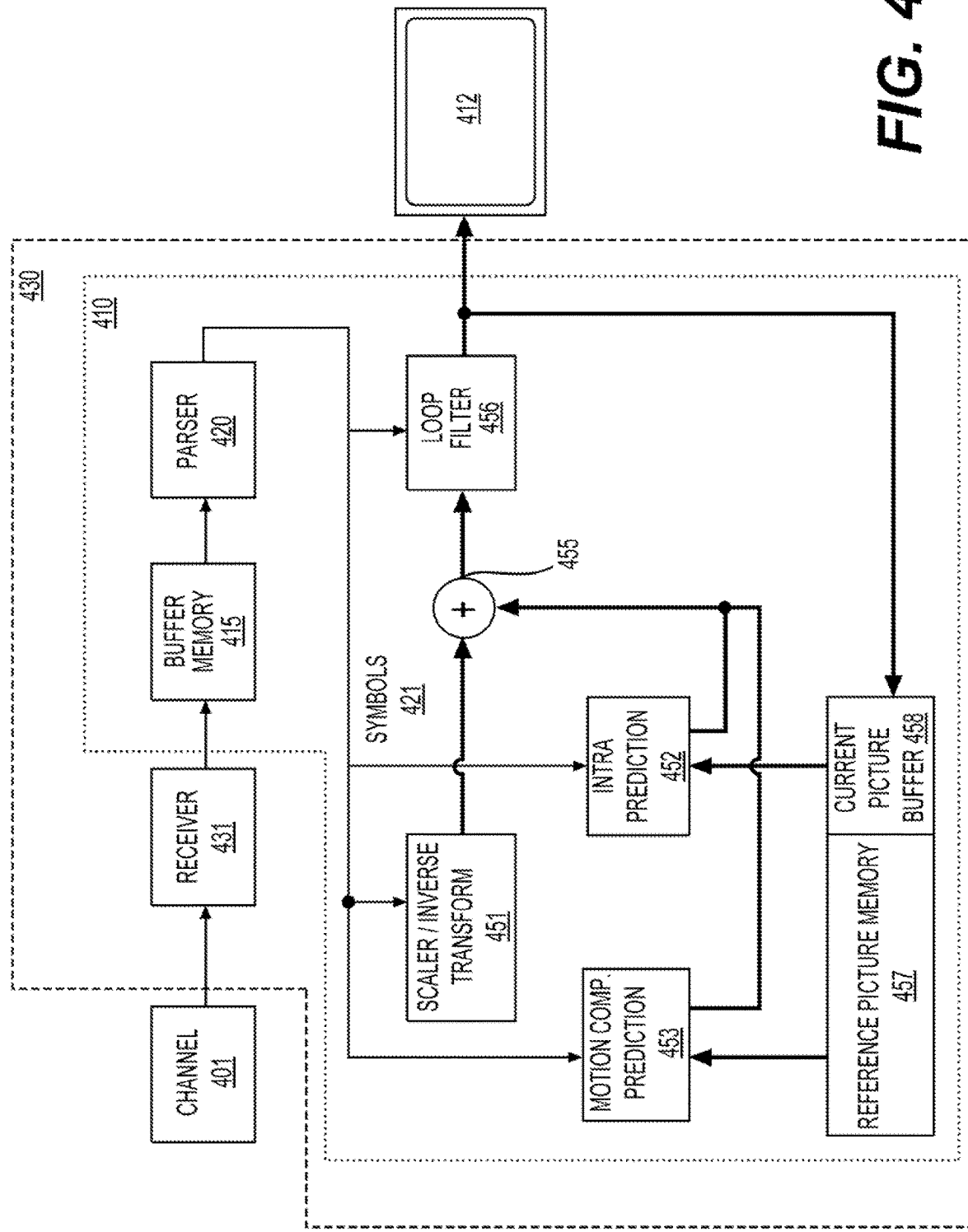
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
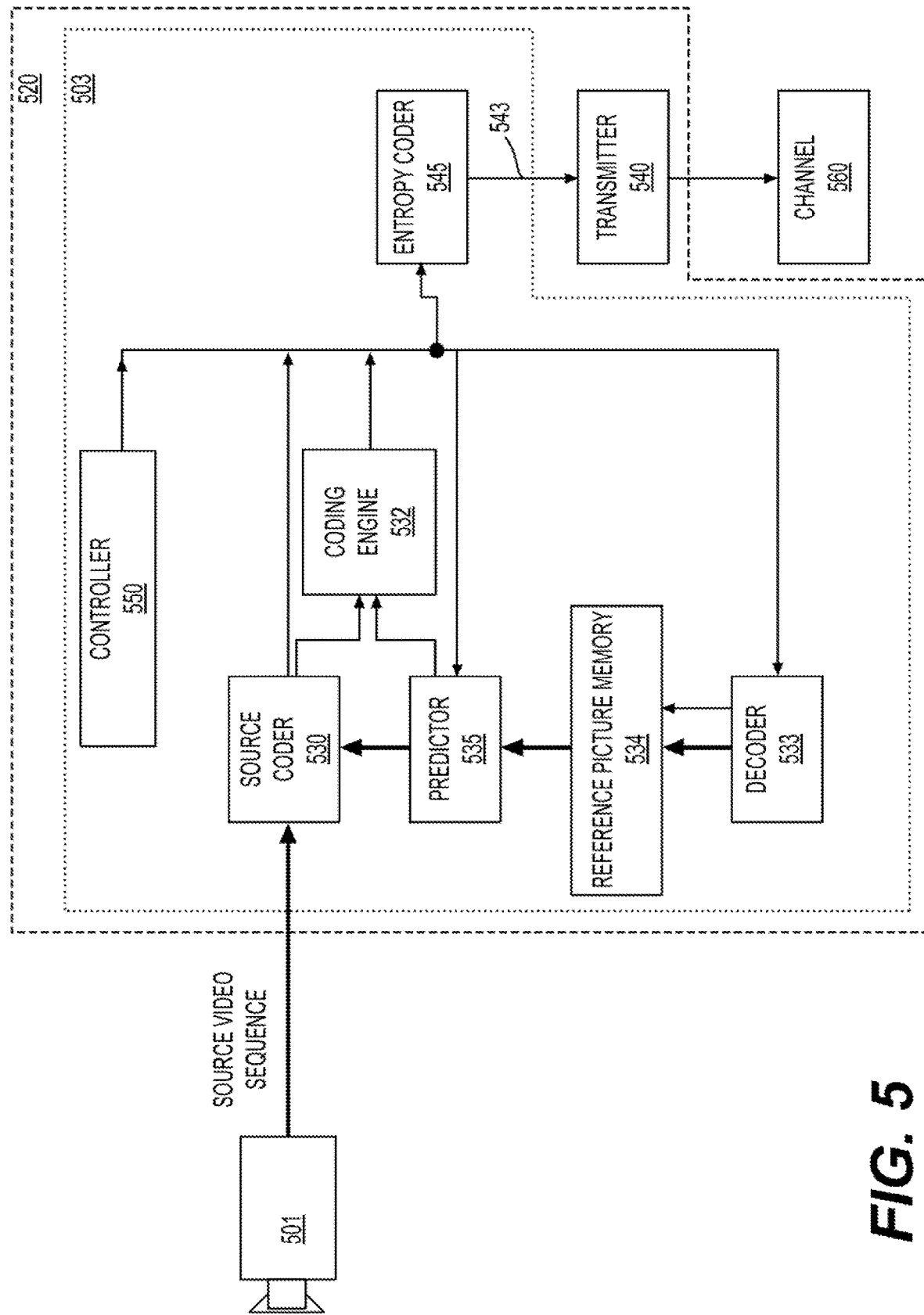
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
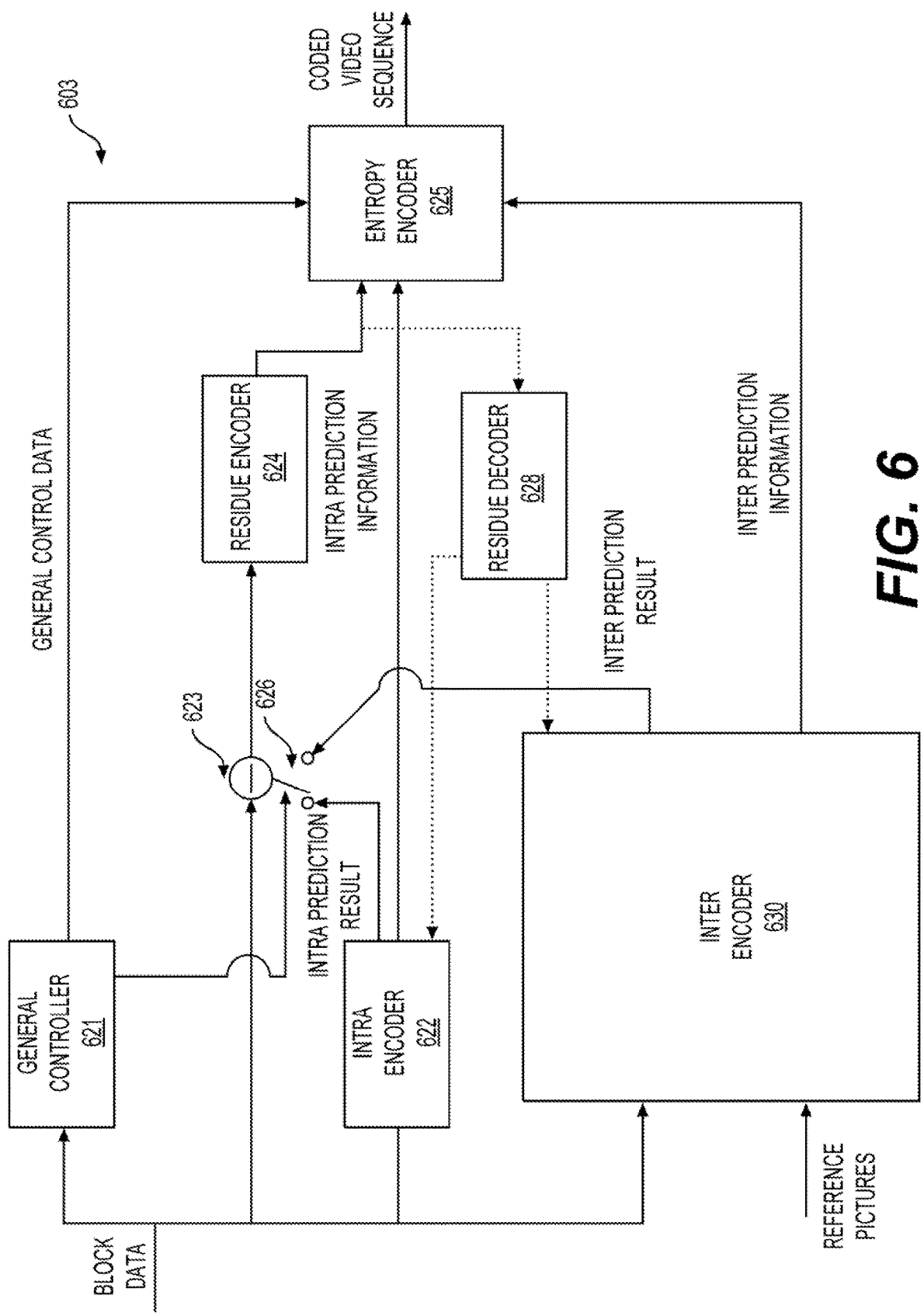
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
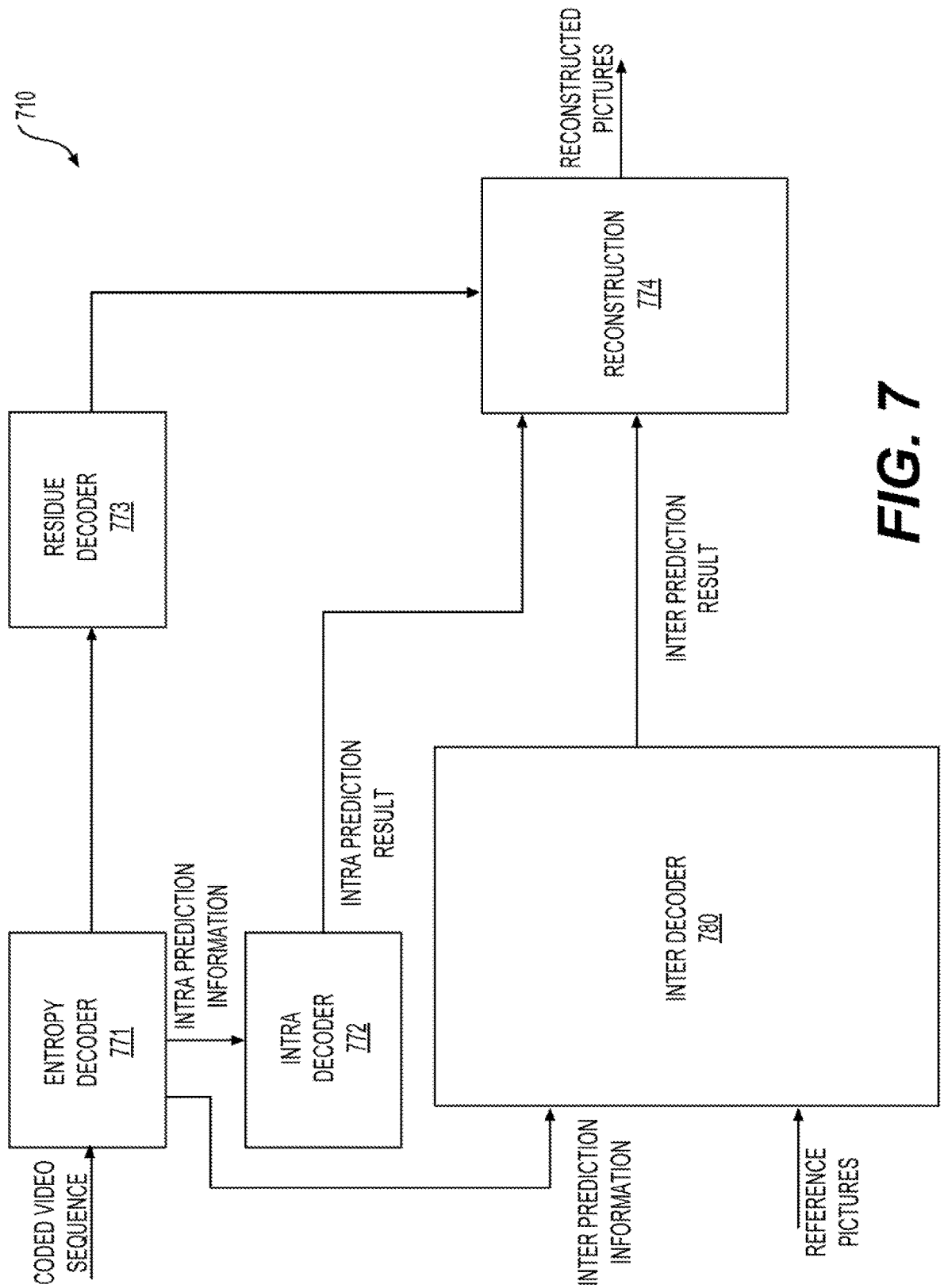
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Inter Picture Prediction Modes

In various embodiments, a picture can be partitioned into blocks, for example, using a tree structure based partition scheme. The resulting blocks can then be processed according to different processing modes, such as an intra prediction mode, an inter prediction mode (e.g., merge mode, skip mode, advanced motion vector prediction (AVMP) mode), and the like. An intra coded block can be a block that is coded with an intra prediction mode. In contrast, an inter coded block can be a block that is processed with an inter prediction mode.

In some embodiments, in the context of the VVC standard for example, for each CU coded according to an inter prediction mode, motion information may include motion vectors, reference picture indices, reference picture list usage index, and other information to be used for inter-predicted sample generation. The motion information, in whole or in part, can be signaled in an explicit or implicit manner. When a CU is coded according to a merge mode, the motion information for the current CU can be obtained from neighboring CUs, including candidates derived from spatially and temporally neighboring CUs. When a CU is coded according to a skip mode, the CU can be associated with one PU and has no significant residual coefficients, no coded motion vector delta, or no reference picture index. In some embodiments, when a CU is not coded according to the merge mode, motion information for the current CU can be explicit transmitted.

In some embodiments, additional inter coding features and refinement tools may include at least (1) extended merge prediction, (2) merge mode with MVD (MMVD), (3) affine motion compensated prediction, (4) subblock-based temporal motion vector prediction (SbTMVP), (5) triangle partition prediction, (6) combined inter and intra prediction (CIIP), and (7) prediction refinement with optical flow (PROF).

1. Affine Prediction Mode

In some examples, a motion vector of a current block and/or sub-blocks of the current block can be derived using an affine model (e.g., a 6-parameter affine model or a 4-parameter affine model). FIG. 8A is a schematic illustration of a 6-parameter (according to three control points) affine model in accordance with an embodiment.

In an example, the 6 parameters of an affine coded block (e.g., current block 802) can be represented by three motion vectors (also referred to as three control point motion vectors (CPMVs, e.g., $CPMV_0$, $CPMV_1$, and $CPMV_2$) at three different locations of the current block (e.g., control points CP0, CP1, and CP2 at upper-left, upper-right, and lower-left corners in FIG. 8A). In some embodiments, for the 6-parameter affine model, a motion vector at a sample location (x, y) in the current block (1202) can be derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases},$$

where ($mv_{0x}$, $mv_{0y}$) represents a motion vector of the upper-left corner control point ($CPMV_0$), ($mv_{1x}$, $mv_{1y}$) represents a motion vector of the upper-right corner control point ($CPMV_1$), and ($mv_{2x}$, $mv_{2y}$) represents a motion vector of the lower-left corner control point ($CPMV_2$). Also, W represents a width of the current block (802), and H represents a height of the current block (802).

FIG. 8B is a schematic illustration of a 4-parameter (according to two control points) affine model in accordance with an embodiment. A simplified affine model can use four parameters to describe the motion information of an affine coded block (e.g., current block 802), which can be represented by two motion vectors (also referred to as two CPMVs, e.g., $CPMV_0$ and $CPMV_1$) at two different locations of the current block (e.g., control points CP0 and CP1 at upper-left and upper-right corners in FIG. 8B). In some embodiments, for the 4-parameter affine model, a motion vector at a sample location (x, y) in the current block (1202) can be derived as:

$$\begin{cases} mv_x = \dfrac{mv_{1x} - mv_{0x}}{W}x + \dfrac{mv_{1x} - mv_{0x}}{W}y + mv_{0x} \\ mv_y = \dfrac{mv_{1y} - mv_{0y}}{W}x + \dfrac{mv_{1y} - mv_{0y}}{W}y + mv_{0y} \end{cases},$$

where ($mv_{0x}$, $mv_{0y}$) represents a motion vector of the upper-left corner control point ($CPMV_0$), and ($mv_{1x}$, $mv_{1y}$) represents a motion vector of the upper-right corner control point ($CPMV_1$). Also, W represents a width of the current block (802).

Figure 8C:
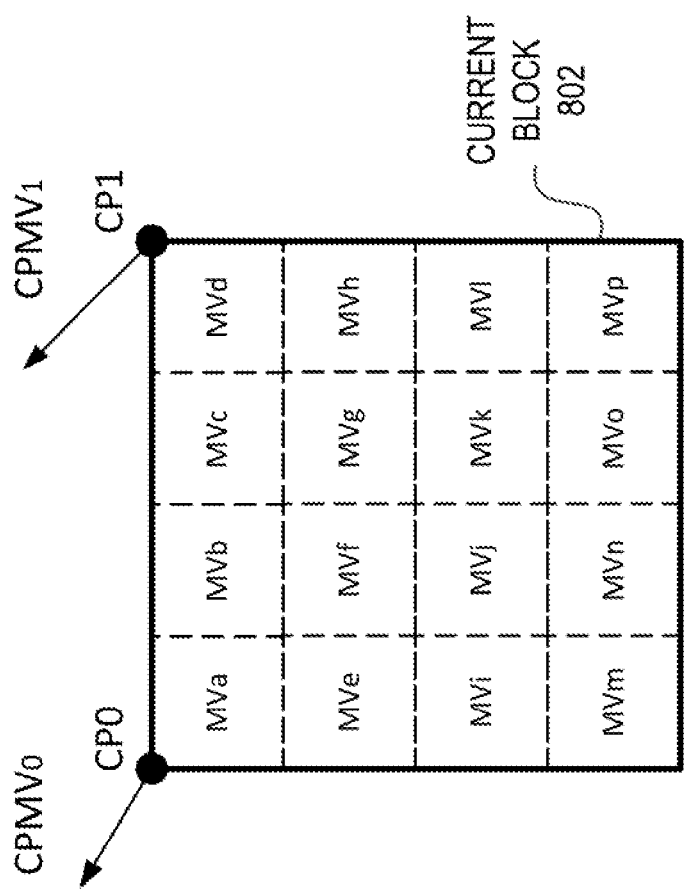
FIG. 8C is a schematic illustration of motion vectors derived for sub-blocks of a current block coded according to an affine prediction method in accordance with an embodiment.

In some embodiments, in order to simplify the motion compensation prediction, subblock-based affine prediction method is applied. FIG. 8C is a schematic illustration of motion vectors derived for sub-blocks of a current block coded according to an affine prediction method in accordance with an embodiment. In FIG. 8C, the current block (802) can be divided into sub-blocks. In this example, each sub-block can be a 4×4 luma sub-block. Sub-block motion vectors (MVa-MVp) correspond to the centers of the respective sub-blocks and can be calculated according to 4-parameter affine prediction method as described above. The sub-block motion vectors can be rounded, for example to $\frac{1}{16}$ fraction accuracy. The motion compensation predicted images for the sub-blocks can be generated according to the calculated sub-block motion vectors.

In some embodiments, the sub-block size of chroma-components can also be set to 4×4. The MV of a 4×4 chroma sub-block can be calculated as the average of the MVs of the four corresponding 4×4 luma sub-blocks.

In some embodiments, the CPMVs can be signaled explicitly. In some embodiments, the CPMVs can be determined according to various CPMV prediction methods, such as an affine merge mode or an affine AMVP mode.

1.1. Affine Merge Mode

Figure 9:
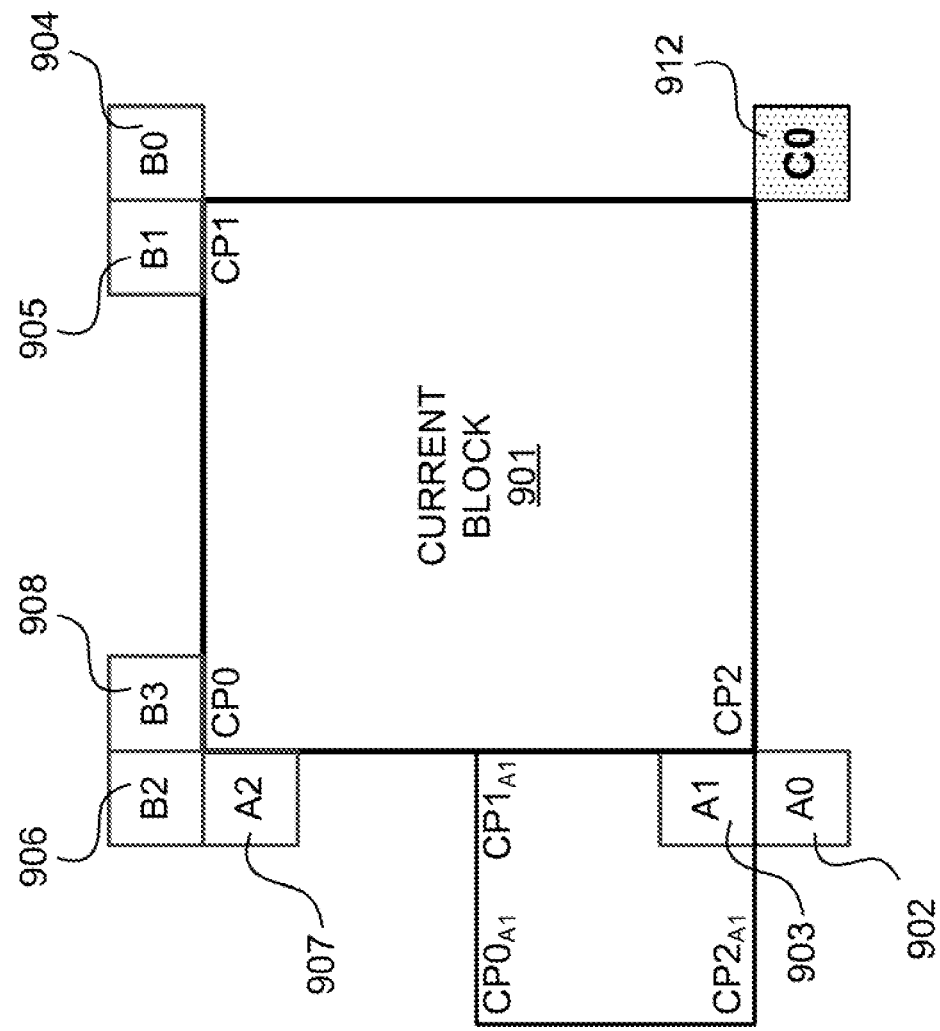
FIG. 9 is a schematic illustration of spatial neighboring blocks and a temporal neighboring block for a current block coded according to an affine prediction method in accordance with an embodiment.

FIG. 9 is a schematic illustration of spatial neighboring blocks and a temporal neighboring block for a current block (901) coded according to an affine prediction method in accordance with an embodiment. As shown, the spatially neighboring blocks are denoted A0, A1, A2, B0, B1, B2, and B3 (902, 903, 907, 904, 905, 906, and 908, respectively), and the temporally neighboring block is denoted C0 (912). In some examples, the spatially neighboring blocks A0, A1, A2, B0, B1, B2, and B3 and the current block (901) are in a same picture. In some examples, the temporally neighboring block C0 is in a reference picture and corresponds to a position outside the current block (901) and adjacent to a lower-right corner of the current block (901).

A list of motion information candidates (also referred to as an affine merge candidate list) can be constructed using an affine merge mode based on motion information of one or more of the spatial neighboring blocks and/or temporal neighboring blocks. In some examples, the affine merge mode can be applied when the current block (901) has a width and height that are equal to or greater than 8 samples. According to the affine merge mode, the CPMVs of the current block (901) can be determined based on the motion information candidates on the list. In some examples, the list of motion information candidates can include up to five CPMV candidates, and an index can be signaled to indicate which CPMV candidate is to be used for the current block. In some embodiments, a CPMV candidate includes all the CPMVs for an affine model.

In some embodiments, the affine merge candidate list can have three types of CPVM candidates, including one or more inherited affine candidates, one or more constructed affine candidates, and a zero MV. An inherited affine candidate can be derived by extrapolation from the CPMVs of the neighboring blocks. A constructed affine candidate can be derived using the translational MVs of the neighboring blocks.

In an example, there can be at most two inherited affine candidates, which are derived from corresponding affine motion models of the neighboring blocks, including one block from left neighboring blocks (A0 and A1) and one from upper neighboring blocks (B0, B1, and B2). For the candidate from the left, neighboring blocks A0 and A1 can be sequentially checked, and a first available inherited affine candidate from neighboring blocks A0 and A1 is used as the inherited affine candidate from the left. For the candidate from the top, neighboring blocks B0, B1, and B2 can be sequentially checked, and a first available inherited affine candidate from neighboring blocks B0, B1, and B2 is used as the inherited affine candidate from the top. In some examples, no pruning check is performed between the two inherited affine candidates.

When a neighboring affine block is identified, a corresponding inherited affine candidate to be added to the affine merge list of the current block (901) can be derived from the control point motion vectors of the neighboring affine block. In the FIG. 9 example, if the neighboring block A1 is coded in affine mode, the motion vectors of the upper-left corner (control point $CP0_{A1}$), the upper-right corner (control point $CP1_{A1}$), and the lower-left corner (control point $CP2_{A1}$) of block A1 can be obtained. When block A1 is coded using a 4-parameter affine model, the two CPMVs as an inherited affine candidate of the current block (901) can be calculated according to the motion vectors of control point $CP0_{A1}$ and control point CP1 A1. When block A1 is coded using a 6-parameter affine model, the three CPMVs as an inherited affine candidate of the current block (901) can be calculated according to the motion vectors of control point $CP0_{A1}$, control point CP1 A1, and control point $CP2_{A1}$.

Moreover, a constructed affine candidate can be derived by combining the neighboring translational motion information of each control point. The motion information for the control points CP0, CP1, and CP2 is derived from the specified spatial neighboring blocks A0, A1, A2, B0, B1, B2, and B3.

For example, $CPMV_k$ (k=1, 2, 3, 4) represents the motion vector of the k-th control point, where $CPMV_1$ corresponds to control point CP0, $CPMV_2$ corresponds to control point CP1, $CPMV_3$ corresponds to control point CP2, and $CPMV_4$ corresponds to a temporal control point based on temporal neighboring block C0. For $CPMV_1$, neighboring blocks B2, B3, and A2 can be sequentially checked, and a first available motion vector from neighboring blocks B2, B3, and A2 is used as $CPMV_1$. For $CPMV_2$, neighboring blocks B1 and B0 can be sequentially checked, and a first available motion vector from neighboring blocks B1 and B0 is used as $CPMV_2$. For $CPMV_3$, neighboring blocks A1 and A0 can be sequentially checked, and a first available motion vector from neighboring blocks A1 and A0 is used as $CPMV_3$. Moreover, the motion vector of temporal neighboring block C0 can be used as $CPMV_4$, if available.

After $CPMV_1$, $CPMV_2$, $CPMV_3$, and $CPMV_4$, of four control points CP0, CP1, CP2 and the temporal control point are obtained, an affine merge candidate list can be constructed to include affine merge candidates that are constructed in an order of: $\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, and $\{CPMV_1, CPMV_3\}$. Any combination of three CPMVs can form a 6-parameter affine merge candidate, and any combination of two CPMVs can form a 4-parameter affine merge candidate. In some examples, in order to avoid a motion scaling process, if the reference indices of a group of control points are different, the corresponding combination of CPMVs can be discarded.

In some embodiments, after inherited affine merge candidates and constructed affine merge candidate are checked, if the list is still not full, zero MVs are inserted to the end of the list.

1.2. Affine AMVP Mode

In some embodiments, a list of motion information candidates can be constructed using an affine AMVP mode when the current block (901) has a width and height that are equal to or greater than 16 samples. According to the affine AMVP mode, an affine flag in the CU level can be signalled in the bitstream to indicate whether affine AMVP mode is used, and then another flag can be signaled to indicate whether a 4-parameter affine or a 6-parameter affine model is used. In the affine AMVP mode, the difference of the CPMVs of the current block and corresponding CPMV predictors (CPMVPs) can be signalled in the bitstream. In some embodiments, an affine AVMP candidate list can have a size of two candidates and can be generated by using the following four types of CPVM candidates in order, including (1) one or more inherited affine AMVP candidates extrapolated from the CPMVs of one or more neighboring CUs; (2) one or more constructed affine AMVP candidates that are derived using the translational MVs of one or more neighboring CUs; (3) one or more translational MVs from one or more neighboring CUs; and (4) Zero MVs.

For deriving inherited affine AMVP candidates, in some examples, the checking order of inherited affine AMVP candidates is the same as the checking order of inherited affine merge candidates. The AVMP candidates can be determined only from the affine CUs that have the same reference picture as the current block. In some embodiments, no pruning process is applied when inserting an inherited affine motion predictor into the candidate list.

For deriving constructed affine AMVP candidates, in some examples, the constructed AMVP candidate can be derived from one or more neighboring blocks as shown in FIG. 9 with the same checking order that is used during the affine merge candidate construction. In addition, the reference picture indices of the neighboring blocks are also checked. For example, the first block in the checking order that is inter coded and has the same reference picture as the current block can be used. In some embodiments, there can be only one constructed affine AMVP candidate. In some embodiments, when the current block is coded according to a 4-parameter affine mode, and the control point motion vectors of a checked neighboring block corresponding to CP0 and CP1 thereof are both available, a collection of these control point motion vectors of the checked neighboring block can be added as a candidate in the affine AMVP list. When the current block is coded according to a 6-parameter affine mode, and the control point motion vectors of a checked neighboring block corresponding to CP0, CP1, and CP2 thereof are all available, a collection of these control point motion vectors of the checked neighboring block can be added as a candidate in the affine AMVP list. Otherwise, the constructed AMVP candidate from the checked neighboring block can be determined as unavailable.

In some embodiments, if the affine AVMP candidate list has less than two candidates after checking the inherited affine AMVP candidates and constructed AMVP candidates, a candidate derived according to translational MVs from one or more neighboring blocks can be added to the affine AVMP candidate list. Finally, zero MVs can be used to fill the affine AVMP candidate list if the list is still not full.

2. Prediction Refinement with Optical Flow (PROF)

In some embodiments, affine motion model parameters can be used to derive the motion vector of each pixel in a CU. However, due to the high complexity and memory access bandwidth requirements for performing pixel-based affine prediction, in some embodiments, a subblock-based affine motion compensation method is implemented. In some embodiments, a current block (e.g., a CU) can be divided into sub-blocks each having a size of 4×4 and assigned with a sub-block MV derived from the control point MVs of the current block. The subblock-based affine motion compensation is a trade-off between improving coding efficiency, complexity, and memory access bandwidth, in exchange of decreased prediction accuracy.

In some embodiments, a prediction refinement with optical flow (PROF) method may be implemented to improve the subblock-based affine motion compensation to have a finer granularity of motion compensation. According to the PROF method, after the subblock-based affine motion compensation is performed, luma predicted samples can be refined by adding a set of adjustment values derived by an optical flow equation.

Figure 10:
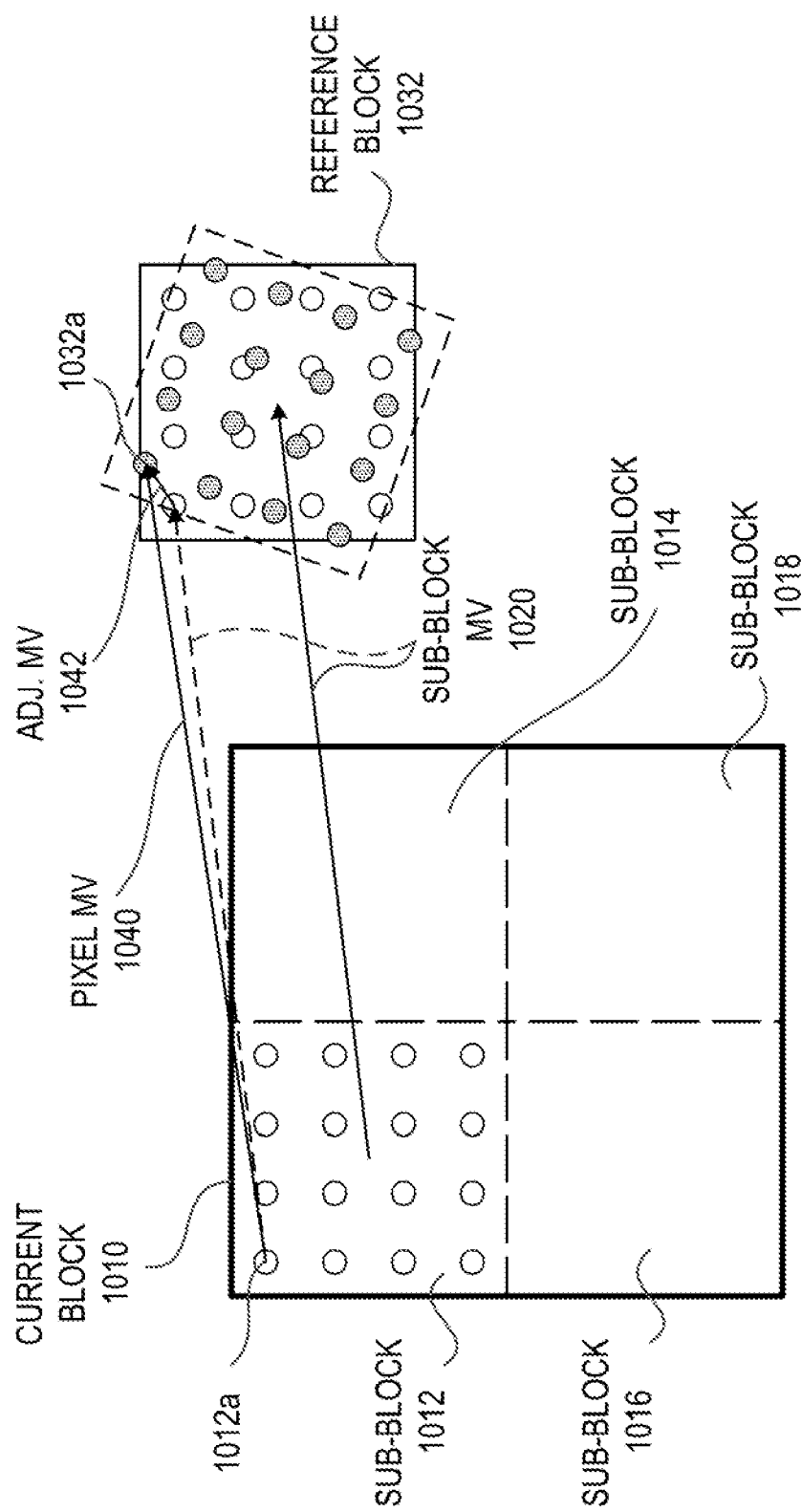
FIG. 10 is a schematic illustration of adjusting a motion vector according to a prediction refinement with optical flow (PROF) method in accordance with an embodiment.

FIG. 10 is a schematic illustration of adjusting a motion vector according to a PROF method in accordance with an embodiment. In the example shown in FIG. 10, a current block (1010) is divided into four sub-blocks (1012, 1014, 1016, and 1018). Each one of the sub-blocks (1012, 1014, 1016, and 1018) has a size of 4×4 pixels. A sub-block MV (1020) for the sub-block (1012) can be derived according to the affine prediction and point to a reference sub-block (1032). Initial sub-block predicted samples can be determined according to the reference sub-block (1032). Refinement values to be applied to the initial sub-block predicted samples can be calculated as if each predicted sample is at a position (e.g., position 1032a for sample 1012a) indicated by a refined MV (e.g., pixel MV 1040) that is determined according to the sub-block MV (e.g., sub-block MV 1020 for sub-block 1012) adjusted by an adjustment vector ΔV (e.g., adjustment vector ΔV 1042).

In some embodiments, the PROF method may begin with performing the subblock-based affine motion compensation to generate an initial sub-block predicted sample I(i, j), where i and j correspond to a particular sample in a current sub-block. Next, the spatial gradients $g_x(i, j)$ and $g_y(i,j)$ of the initial sub-block predicted sample I(i, j) can be calculated using a 3-tap filter [−1, 0, 1] according to $g_x(i, j)=I(i+1, j)-I(i-1, j)$, and
$g_y(i,j)=I(i,j+1)-I(i,j-1)$.

The sub-block prediction is extended by one pixel on each side for the gradient calculation. In some embodiments, to reduce the memory bandwidth and complexity, the pixels on the extended borders can be copied from the nearest integer pixel position in the reference picture. Therefore, additional interpolation for a padding region is avoided.

Afterwards, the prediction refinement can be calculated by the optical flow equation:

$$\Delta I(i,j)=g_x(i,j)*\Delta v_x(i,j)+g_y(i,j)*\Delta v_y(i,j).$$

where the Δv(i, j) (e.g., ΔV 1042) is the difference between pixel MV for sample location (i,j), denoted by v(i, j), and the sub-block MV of the sub-block (e.g., sub-block MV 1020) to which the pixel location (i,j) belongs. Since the affine model parameters and the pixel location relative to the sub-block center are not changed from sub-block to sub-block, Δv(i,j) can be calculated for the first sub-block, and reused for other sub-blocks in the same CU. In some examples, let x and y be the horizontal and vertical position of Δv(i,j) with respect to the center of the sub-block, Δv(i,j) can be derived by the following equation, $$\begin{cases} \Delta v_x(x, y) = a*x + b*y \\ \Delta v_y(x, y) = c*x + d*y \end{cases}$$

where $\Delta v_x(x, y)$ is the x component of Δv(i,j), and $\Delta v_y(x, y)$ is they component of Δv(i,j).

For a 4-parameter affine model, $$\begin{cases} a = d = \dfrac{v_{1x} - v_{0x}}{w} \\ c = -b = \dfrac{v_{1y} - v_{0y}}{w} \end{cases}$$

For a 6-parameter affine model, $$\begin{cases} a = \dfrac{v_{1x} - v_{0x}}{w} \\ b = \dfrac{v_{2x} - v_{0x}}{h} \\ c = \dfrac{v_{1y} - v_{0y}}{w} \\ d = \dfrac{v_{2y} - v_{0y}}{h} \end{cases}$$

where $(v_{0x}, v_{0y})$, $(v_{1x}, v_{1y})$, and $(v_{2x}, v_{2y})$ are the upper-left, upper-right, and lower-left control point motion vectors, and w and h are the width and height of the CU.

Finally, the prediction refinement can be added to the initial sub-block predicted sample I(i, j). The final predicted sample I' according to the PROF method can be generated using the following equation:

$$I'(i,j)=I(i,j)+\Delta I(i,j).$$

3. Affine Sub-Block Motion Vector Constraints

In some embodiments, sub-block motion vector constraints may be introduced to reduce the memory bandwidth for subblock-based inter prediction modes. In some examples when an inter block (having a width W and a height H) is coded according to a subblock-based affine mode, such as affine, ATMVP, or planar MV prediction, the sub-block MVs for sub-blocks inside an M×N region (M<=W, N<=H) can be limited such that a maximum absolute difference between the integer part of each component of the sub-block MVs of each prediction list is no larger than a certain threshold (also referred to as a target difference), such as 0, 1, 2, or 3 integer pixels.

In some embodiments, the target difference can be determined according to one or more of a size and a shape of the current block. In some embodiments, the target difference can be a predetermined value set by a video coding standard or signaled via a coded video bitstream.

Different sub-block motion vector clipping methods can be used to adaptively adjust (or also referred to as "clip" in this disclosure) a sub-block motion vector for a sub-block inside an M×N region to be within a target range. In some embodiments, the target range can be determined based on a maximum value and a minimum value of sub-block MVs for the sub-blocks inside the M×N region.

In this disclosure, "xy" denotes either "x" for x component along the x coordinate direction or "y" for y component along the y coordinate direction, and the described calculation or equations are similarly applicable to both the x component and y component. In some embodiments, MV_i[xy] denotes an $i^{th}$ sub-block MV (of a target reference list) in the M×N region, and fracMvShift[xy] denotes a number of bits to represent the precision of the MV component, and maxOffset[xy]=(((1+T[xy])<<fracMvShift[xy])−1) indicates a maximum allowable difference. In one example, fracMvShift[xy] can be set to 4, which indicates a ¹⁄₁₆-pel MV precision. Also, T[xy] is the maximum integer difference between sub-block MVs of the target reference list. When T[xy] is set to 0, the sub-block MVs share the same integer part (for the given component of the target list).

In some embodiments, the target range can be determined according to minMv[xy] or maxMv[xy] (e.g., including minimum value for x coordinate direction "minMv[x]," minimum value for y coordinate direction "minMv[y]," maximum value for x coordinate direction "maxMv[x]," and maximum value for y coordinate direction "maxMv[y],"). In some embodiments, the range constraints for the x coordinate direction and the range constraints for the y coordinate direction can be the same or different. One example is shown in the following pseudo code:

minMv[xy] = min(MV_i[xy]); // get minimal MV component of sub-block MVs of the target reference list
maxMv[xy]= max(MV_i[xy]); // get maximal MV component of sub-block MVs -continued

```
of the target reference list
   roundMin[xy] = minMv[xy] >> fracMvShift[xy] << fracMvShift[xy]; // get
integer part of minMv[xy]
   roundMax[xy] = (maxMv[xy] >> fracMvShift[xy] << fracMvShift[xy]) +
maxOffset[xy]; // get max possible value which shares the same integer part with
maxMv[xy]
   if ((minMv[xy] − roundMin[xy]) < (roundMax[xy] − maxMv[xy]))
   {// derive based on minMv[xy] when minMv[xy] is closer to an integer
      minMv[xy] = roundMin[xy];
      maxMv[xy] = minMv[xy] + maxOffset[xy];
   }
   else
   {// derive based on maxMv[xy] when maxMv[xy] is closer to an integer
      maxMv[xy] = roundMax[xy];
      minMv[xy] = maxMv[xy] − maxOffset[xy];
   }
```

Accordingly, in an example, a target range along a particular coordinate direction (e.g., x or y coordinate direction) for a current block can be determined by determining one of an upper bound value (e.g., maxMv[xy]) and a lower bound value (e.g., minMv[xy]) of the target range along the particular coordinate direction according to a maximum value (e.g., max(MV_i[xy])) or a minimum value (e.g., min(MV_i[xy])) of the plurality of first sub-block motion vectors along the particular coordinate direction. The other one of the upper bound value and the lower bound value of the target range along the particular coordinate direction can be determined according to the determined one of the upper bound value and the lower bound value and a target difference (e.g., maxOffset[xy]).

The target range can be defined according to the maximum and minimum values along the x coordinate or y coordinate (e.g., maxMv[xy] and minMv[xy]) to limit the sub-block MVs of the target reference list.

In one example, a sub-block MV can be adjusted by first determining whether the sub-block MV along a particular coordinate direction is greater than the upper bound value or less than the lower bound value along the particular coordinate direction. The sub-block MV along the particular coordinate direction can be set to the upper bound value when the sub-block MV along the particular coordinate direction is determined to be greater than the upper bound value. The sub-block MV along the particular coordinate direction can be set to the lower bound value when the sub-block MV along the particular coordinate direction is determined to be less than the lower bound value. In some examples, the adjusted sub-block MV can be set to be the same as the initial sub-block MV along the particular coordinate direction when the sub-block MV along the particular coordinate direction is not greater than the upper bound value and is not less than the lower bound value. The same process can be applicable to adjusting both the x component of the sub-block MV along the x coordinate direction and the y component of the sub-block MV along the y coordinate direction.

In some embodiments, each of the plurality of sub-blocks has a size of 4×4 pixels, the target difference along the x coordinate direction is 1 pixel, and the target difference along the y coordinate direction is 1 pixel.

III. PROF Calculation with Clipped Sub-Block MV

In some embodiments, when PROF (e.g., the method described in Section II.2) and an affine sub-block MV constraint (e.g., the method described in Section II.3) are both applied on a current block, the sub-block motion vectors of each sub-block may be first generated by an affine model and subsequently adjusted according to the sub-block MV constraint. The predicted samples may be determined according to the adjusted sub-block MVs using the PROF method.

For example, as described in Section II.2, PROF for affine includes calculation of an adjustment vector Δv(i,j), which is a motion vector difference between a pixel MV (denoted as v(i,j)) determined for a sample location (i,j) and a corresponding sub-block MV of the sub-block to which sample location (i, j) belongs. The sub-block MV for the PROF can be the sub-block MV that has been adjusted (denoted as $SBMV_{clip}$) according to an affine sub-block MV constraint as described in Section II.3. Therefore, the relationship between the pixel MV and the adjustment vector may be denoted as:

$$\Delta v(i,j) = v(i,j) - SBMV_{clip}.$$

In some embodiments, each of the plurality of sub-blocks can have a size of 4×4 pixels, the target difference for the x-coordinate direction can be set to 1 pixel, and the target difference for the y coordinate direction can be set to 1 pixel.

Figure 11:
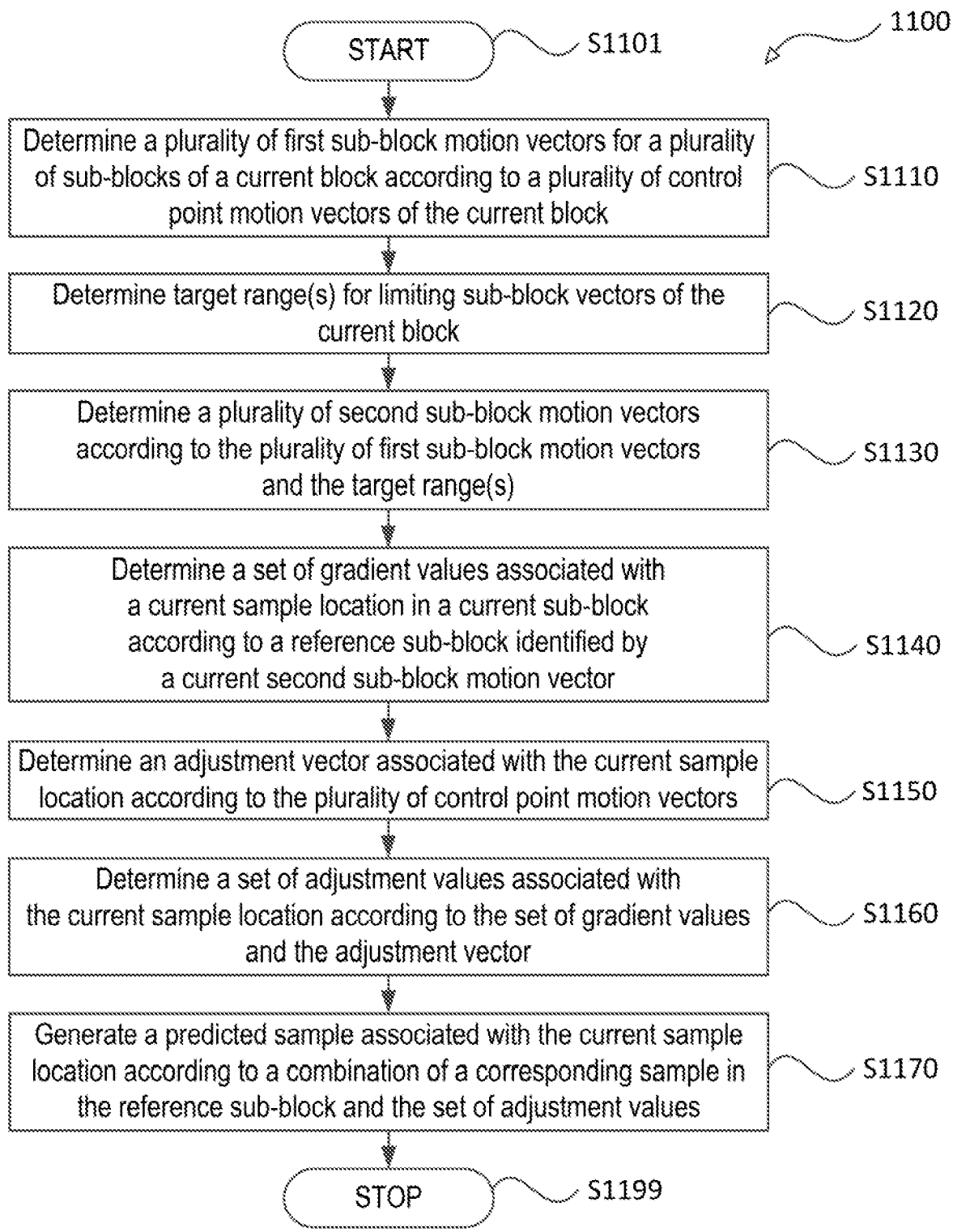
FIG. 11 shows a flow chart outlining a process according to some embodiments of the disclosure.

FIG. 11 shows a flow chart outlining a process (1100) according to some embodiments of the disclosure. The process (1100) can be used in encoding or decoding a current block of a current picture, including obtaining a predicted image of a current block according to a stacked affine prediction method. In some embodiments, one or more operations are performed before or after process (1100), and some of the operations illustrated in FIG. 11 may be reordered or omitted.

In various embodiments, the process (1100) is executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (1100) is implemented in software instructions, thus when the processing circuitry executes the software instructions, the processing circuitry performs the process (1100). The process starts at (S1101) and proceeds to (S1110).

At (S1110), a plurality of first sub-block motion vectors for a plurality of sub-blocks of a current block is determined according to a plurality of control point motion vectors of the current block. In some embodiments, the control point motion vectors of the current block and the first sub-block motion vectors can be determined according to the examples as described with reference to Section II.1 and FIGS. 8A-8C, 9.

At (S1120), one or more target ranges for limiting sub-block vectors of the current block are determined. At (S1130), a plurality of second sub-block motion vectors can be determined according to the plurality of first sub-block motion vectors and the one or more target ranges from (S1120).

In some embodiments, a first target range along a first coordinate direction, such as the x coordinate direction, for the current block can be determined according to the examples as described with reference to Section II.3. In some embodiments, a second target range along a second coordinate direction, such as the y coordinate direction, for the current block can be determined according to the examples as described with reference to Section II.3.

In some embodiments, the first target range limits a maximum difference of integer-pixel portions of the first coordinate direction components of the plurality of second sub-block motion vectors to be no greater than a first target difference. In some embodiments, the second target range limits a maximum difference of integer-pixel portions of the second coordinate direction components of the plurality of second sub-block motion vectors to be no greater than a second target difference.

In some embodiments, the first target difference and the second target difference can be the same or different. In some embodiments, the first target difference or the second target difference ranges from 0 to 3 integer pixels. In some embodiments, the first target difference or the second target difference can be determined according to one or more of a size and a shape of the current block. In some embodiments, the first target difference or the second target difference can be determined to be a predetermined value set by a video coding standard or signaled via a coded video bitstream.

In some embodiments, the first target range along the first coordinate direction for the current block can be determined by determining one of an upper bound value and a lower bound value of the first target range along the first coordinate direction according to a maximum value or a minimum value of the first coordinate direction components of the plurality of first sub-block motion vectors, and determining the other one of the upper bound value and the lower bound value of the first target range along the first coordinate direction according to the determined one of the upper bound value and the lower bound value and the first target difference. The second target range can be determined in a similar manner according to the second target difference and the second coordinate direction components of the plurality of first sub-block motion vectors.

In some embodiments, the plurality of second sub-block motion vectors can be determined according to the plurality of first sub-block motion vectors and the first target range and/or the second target range. For example, a second sub-block motion vector can be determined according to a first sub-block motion vector, where both the sub-block motion vectors correspond to a same sub-block. For the components along the first coordinate direction, whether a first coordinate direction component of the first sub-block motion vector is greater than an upper bound value or less than a lower bound value for the first coordinate direction is determined. The first coordinate direction component of the second sub-block motion vector can be set to the upper bound value when the first coordinate direction component of the first sub-block motion vector is determined to be greater than the upper bound value. Also, the first coordinate direction component of the second sub-block motion vector can be set to the lower bound value when the first coordinate direction component of the first sub-block motion vector is determined to be less than the lower bound value. In some embodiments, the first coordinate direction component of the second sub-block motion vector can be set to be the same as the first coordinate direction component of the first sub-block motion vector when the first coordinate direction component of the first sub-block motion vector is determined not to be greater than the upper bound value and not less than the lower bound value. The second coordinate direction components can be determined in a similar manner according to an upper bound value and a lower bound value for the second coordinate direction.

In some embodiments, each of the plurality of sub-blocks can have a size of 4×4 pixels, the first target difference can be set to 1 pixel, and the second target difference can be set to 1 pixel.

At (S1140), a set of gradient values associated with a current sample location in a current sub-block from the plurality of sub-blocks can be determined according to a reference sub-block identified by a current second sub-block motion vector that corresponds to the current sub-block from the plurality of second sub-block motion vectors. In some embodiments, the set of gradient values can be determined according to the examples as described with reference to Section II.2 and FIG. 10.

At (S1150), an adjustment vector associated with the current sample location can be determined according to the plurality of control point motion vectors of the current block. In some embodiments, the adjustment vector can be determined according to the examples as described with reference to Section II.2 and FIG. 10.

At (S1160), a set of adjustment values associated with the current sample location can be determined according to the set of gradient values and the adjustment vector. In some embodiments, the set of adjustment values can be determined according to the examples as described with reference to Section II.2 and FIG. 10.

At (S1170), a predicted sample associated with the current sample location according to a combination of a corresponding sample in the reference sub-block and the set of adjustment values. In some embodiments, the predicted sample can be determined according to the examples as described with reference to Section II.2 and FIG. 10.

After (S1170), the process (1100) may proceed to (S1199) and terminate.

The embodiments described herein may be used separately or combined in any order. Further, each of the embodiments, encoder, and decoder may be implemented by processing circuitry (e.g., one or more processors or one or more integrated circuits). In one example, the one or more processors execute a program that is stored in a non-transitory computer-readable medium.

IV. Computer System

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
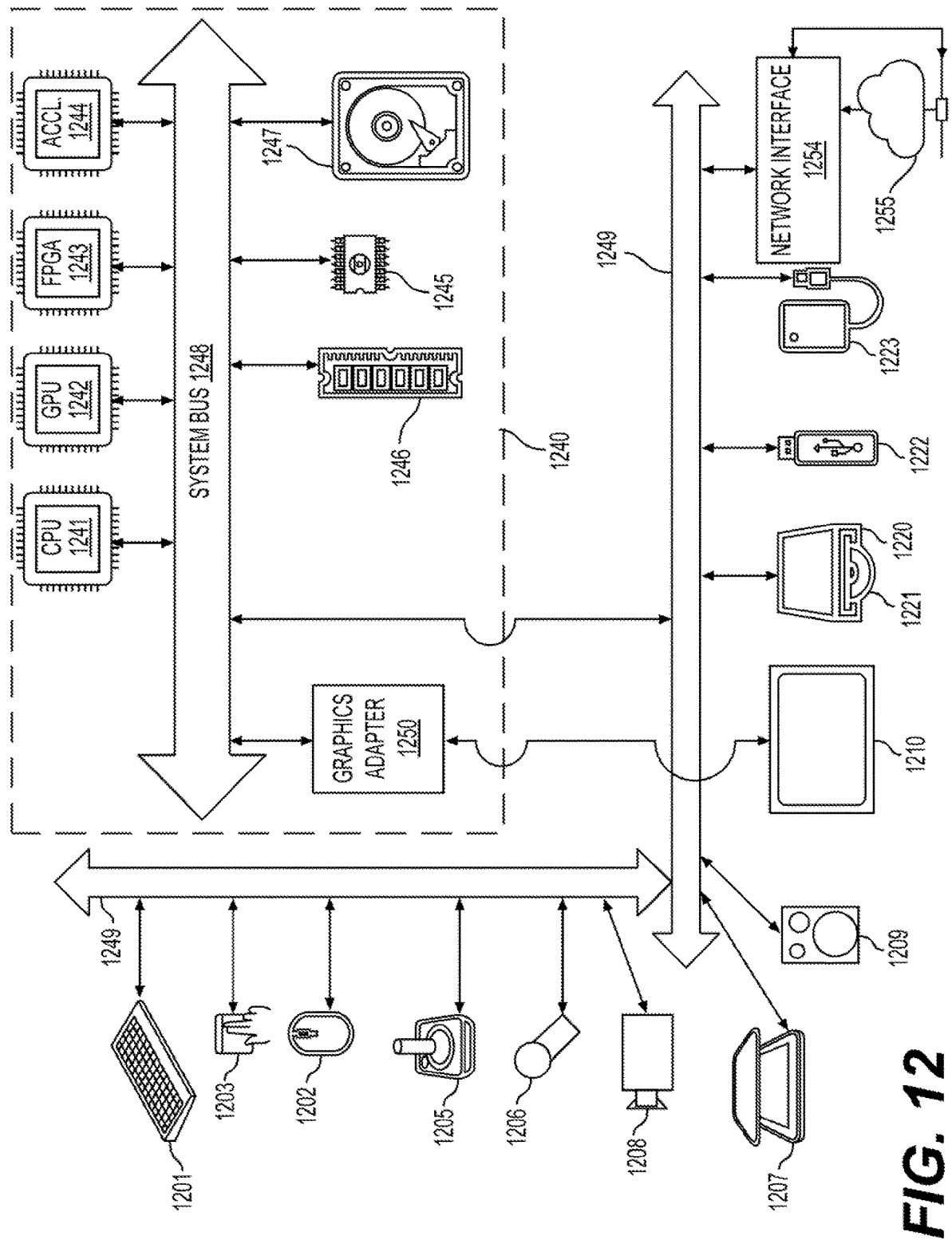
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid state drive (1223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1200) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieve to any of the memory devices can be enabled through the use of cache memory, that can be closely associated with one or more CPU (1241), GPU (1242), mass storage (1247), ROM (1245), RAM (1246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
AMVP: Advanced Motion Vector Prediction
ASIC: Application-Specific Integrated Circuit
BMS: Benchmark Set
CANBus: Controller Area Network Bus
CD: Compact Disc
CPMV: Control Point Motion Vector
CPUs: Central Processing Units
CRT: Cathode Ray Tube
CTUs: Coding Tree Units
CU: Coding Unit
DVD: Digital Video Disc
FPGA: Field Programmable Gate Areas
GBi: Generalized Bi-prediction
GOPs: Groups of Pictures
GPUs: Graphics Processing Units
GSM: Global System for Mobile communications
HEVC: High Efficiency Video Coding
HMVP: History-based Motion Vector Prediction
HRD: Hypothetical Reference Decoder
IC: Integrated Circuit
JEM: Joint Exploration Model
LAN: Local Area Network
LCD: Liquid-Crystal Display
LTE: Long-Term Evolution
MMVD: Merge with MVD
MV: Motion Vector
MVD: Motion Vector Difference
MVP: Motion Vector Predictor
OLED: Organic Light-Emitting Diode
PBs: Prediction Blocks
PCI: Peripheral Component Interconnect
PLD: Programmable Logic Device
PUs: Prediction Units
RAM: Random Access Memory
ROM: Read-Only Memory
SEI: Supplementary Enhancement Information
SNR: Signal Noise Ratio
SSD: Solid-State Drive
SPS: Sequence Parameter Set
SbTMVP: Subblock-based Temporal Motion Vector Prediction
TMVP: Temporal Motion Vector Prediction
TUs: Transform Units,
USB: Universal Serial Bus
VTM: Versatile Test Model
VUI: Video Usability Information
VVC: Versatile Video Coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video encoding, comprising:
   determining a plurality of first sub-block motion vectors for a plurality of sub-blocks of a current block according to an affine model for the current block and a plurality of control point motion vectors of the affine model for the current block;
   determining a plurality of second sub-block motion vectors by respectively constraining the plurality of first sub-block motion vectors according to a first target range, the first target range limiting first coordinate direction components of the plurality of second sub-block motion vectors;
   determining a set of gradient values associated with a current sample location in a current sub-block from the plurality of sub-blocks according to a reference sub-block identified by a current second sub-block motion vector that corresponds to the current sub-block from the plurality of second sub-block motion vectors;
   determining a set of adjustment values associated with the current sample location according to the set of gradient values and an adjustment vector associated with the current sample location; and
   generating a predicted sample associated with the current sample location according to a combination of a corresponding sample in the reference sub-block and the set of adjustment values.

2. The method of claim 1, wherein
   the first target range limits a maximum difference of integer-pixel portions of the first coordinate direction components of the plurality of second sub-block motion vectors to be no greater than a first target difference.

3. The method of claim 2, wherein the first target difference ranges from 0 to 3 integer pixels.

4. The method of claim 2, further comprising:
   determining the first target difference according to one or more of a size and a shape of the current block.

5. The method of claim 2, further comprising:
   determining the first target difference according to a predetermined value set by a video coding standard or signaled via a coded video bitstream.

6. The method of claim 1, further comprising:
   determining one of an upper bound value and a lower bound value of the first target range along a first coordinate direction according to a maximum value or a minimum value of first coordinate direction components of the plurality of first sub-block motion vectors; and
   determining the other one of the upper bound value and the lower bound value of the first target range along the first coordinate direction according to the determined one of the upper bound value and the lower bound value and a first target difference, wherein
   the determining the plurality of second sub-block motion vectors includes:

determining whether a first coordinate direction component of one of the plurality of first sub-block motion vectors is greater than the upper bound value or less than the lower bound value, the one of the plurality of first sub-block motion vectors corresponding to one of the plurality of sub-blocks;

setting a first coordinate direction component of one of the plurality of second sub-block motion vectors to the upper bound value when the first coordinate direction component of the one of the plurality of first sub-block motion vectors is determined to be greater than the upper bound value, the one of the plurality of second sub-block motion vectors corresponding to the one of the plurality of sub-blocks; and setting the first coordinate direction component of the one of the plurality of second sub-block motion vectors to the lower bound value when the first coordinate direction component of the one of the plurality of first sub-block motion vectors is determined to be less than the lower bound value.

7. The method of claim 6, wherein the determining the plurality of second sub-block motion vectors further comprises:

setting the first coordinate direction component of the one of the plurality of second sub-block motion vectors to be the same as the first coordinate direction component of the one of the plurality of first sub-block motion vectors when the first coordinate direction component of the one of the plurality of first sub-block motion vectors is determined not to be greater than the upper bound value and not less than the lower bound value.

8. The method of claim 1, further comprising:

determining a second target range along a second coordinate direction for the current block, the second target range limiting second coordinate direction components of the plurality of second sub-block motion vectors, wherein the determining the plurality of second sub-block motion vectors is performed by constraining the plurality of first sub-block motion vectors according to the first target range and the second target range.

9. The method of claim 8, wherein the first target range limits a first maximum difference of integer-pixel portions of the first coordinate direction components of the plurality of second sub-block motion vectors to be no greater than a first target difference, and the second target range limits a second maximum difference of integer-pixel portions of the second coordinate direction components of the plurality of second sub-block motion vectors to be no greater than a second target difference.

10. The method of claim 9, wherein
each of the plurality of sub-blocks has a size of 4×4 pixels,
the first target difference is 1 pixel, and
the second target difference is 1 pixel.

11. The method of claim 1, further comprising:

determining a set of adjustment vectors associated with sample locations in the current sub-block according to the plurality of control point motion vectors of the affine model for the current block, the sample locations being relative positions with respect to the current sub-block, wherein the set of adjustment vectors is applicable to all other sub-blocks of the current block.

12. The method of claim 1, wherein the determining the set of gradient values is performed according to the reference sub-block and a 3-tap filter.

13. An apparatus, comprising:

processing circuitry configured to:

determine a plurality of first sub-block motion vectors for a plurality of sub-blocks of a current block according to an affine model for the current block and a plurality of control point motion vectors of the affine model for the current block;

determine a plurality of second sub-block motion vectors by respectively constraining the plurality of first sub-block motion vectors according to a first target range, the first target range limiting first coordinate direction components of the plurality of second sub-block motion vectors;

determine a set of gradient values associated with a current sample location in a current sub-block from the plurality of sub-blocks according to a reference sub-block identified by a current second sub-block motion vector that corresponds to the current sub-block from the plurality of second sub-block motion vectors;

determine a set of adjustment values associated with the current sample location according to the set of gradient values and an adjustment vector associated with the current sample location; and generate a predicted sample associated with the current sample location according to a combination of a corresponding sample in the reference sub-block and the set of adjustment values.

14. The apparatus of claim 13, wherein the first target range limits a maximum difference of integer-pixel portions of the first coordinate direction components of the plurality of second sub-block motion vectors to be no greater than a first target difference.

15. The apparatus of claim 13, wherein the processing circuitry is further configured to:

determine one of an upper bound value and a lower bound value of the first target range along a first coordinate direction according to a maximum value or a minimum value of first coordinate direction components of the plurality of first sub-block motion vectors;

determine the other one of the upper bound value and the lower bound value of the first target range along the first coordinate direction according to the determined one of the upper bound value and the lower bound value and a first target difference;

determine whether a first coordinate direction component of one of the plurality of first sub-block motion vectors is greater than the upper bound value or less than the lower bound value, the one of the plurality of first sub-block motion vectors corresponding to one of the plurality of sub-blocks;

set a first coordinate direction component of one of the plurality of second sub-block motion vectors to the upper bound value when the first coordinate direction component of the one of the plurality of first sub-block motion vectors is determined to be greater than the upper bound value, the one of the plurality of second sub-block motion vectors corresponding to the one of the plurality of sub-blocks; and set the first coordinate direction component of the one of the plurality of second sub-block motion vectors to the lower bound value when the first coordinate direction component of the one of the plurality of first sub-block motion vectors is determined to be less than the lower bound value.

16. The apparatus of claim 15, wherein the processing circuitry is further configured to:
set the first coordinate direction component of the one of the plurality of second sub-block motion vectors to be the same as the first coordinate direction component of the one of the plurality of first sub-block motion vectors when the first coordinate direction component of the one of the plurality of first sub-block motion vectors is determined not to be greater than the upper bound value and not less than the lower bound value.

17. The apparatus of claim 13, wherein the processing circuitry is further configured to:
determine a second target range along a second coordinate direction for the current block, the second target range limiting second coordinate direction components of the plurality of second sub-block motion vectors; and
determine the plurality of second sub-block motion vectors by further constraining the plurality of first sub-block motion vectors according to the second target range.

18. The apparatus of claim 13, wherein the processing circuitry is further configured to:
determine a set of adjustment vectors associated with sample locations in the current sub-block according to the plurality of control point motion vectors of the affine model for the current block, the sample locations being relative positions with respect to the current sub-block, the set of adjustment vectors being applicable to all other sub-blocks of the current block.

19. A non-transitory computer-readable medium storing instructions which, when executed by a computer for video encoding, cause the computer to perform:
determining a plurality of first sub-block motion vectors for a plurality of sub-blocks of a current block according to an affine model for the current block and a plurality of control point motion vectors of the affine model for the current block;
determining a plurality of second sub-block motion vectors by respectively constraining the plurality of first sub-block motion vectors according to a first target range, the first target range limiting first coordinate direction components of the plurality of second sub-block motion vectors;
determining a set of gradient values associated with a current sample location in a current sub-block from the plurality of sub-blocks according to a reference sub-block identified by a current second sub-block motion vector that corresponds to the current sub-block from the plurality of second sub-block motion vectors;
determining a set of adjustment values associated with the current sample location according to the set of gradient values and an adjustment vector associated with the current sample location; and
generating a predicted sample associated with the current sample location according to a combination of a corresponding sample in the reference sub-block and the set of adjustment values.

20. The non-transitory computer-readable medium of claim 19, wherein the instructions further cause the computer to perform:
determining one of an upper bound value and a lower bound value of the first target range along a first coordinate direction according to a maximum value or a minimum value of first coordinate direction components of the plurality of first sub-block motion vectors; and
determining the other one of the upper bound value and the lower bound value of the first target range along the first coordinate direction according to the determined one of the upper bound value and the lower bound value and a first target difference, wherein
the determining the plurality of second sub-block motion vectors includes:
determining whether a first coordinate direction component of one of the plurality of first sub-block motion vectors is greater than the upper bound value or less than the lower bound value, the one of the plurality of first sub-block motion vectors corresponding to one of the plurality of sub-blocks;
setting a first coordinate direction component of one of the plurality of second sub-block motion vectors to the upper bound value when the first coordinate direction component of the one of the plurality of first sub-block motion vectors is determined to be greater than the upper bound value, the one of the plurality of second sub-block motion vectors corresponding to the one of the plurality of sub-blocks; and
setting the first coordinate direction component of the one of the plurality of second sub-block motion vectors to the lower bound value when the first coordinate direction component of the one of the plurality of first sub-block motion vectors is determined to be less than the lower bound value.

* * * * *